(12) United States Patent
Truong

(10) Patent No.: US 8,959,296 B2
(45) Date of Patent: Feb. 17, 2015

(54) METHOD AND APPARATUS FOR CENTRALIZED TIMESTAMP PROCESSING

(75) Inventor: Pat Truong, Mississauga (CA)

(73) Assignee: ATI Technologies ULC, Markham, Ontario (CA)

( * ) Notice: Subject to any disclaimer, the term of this patent is extended or adjusted under 35 U.S.C. 154(b) by 619 days.

(21) Appl. No.: 13/324,394

(22) Filed: Dec. 13, 2011

(65) Prior Publication Data

US 2013/0151797 A1   Jun. 13, 2013

(51) Int. Cl.
*G06F 13/00* (2006.01)
(52) U.S. Cl.
USPC ............. 711/156; 711/E12.002; 345/502; 345/522
(58) Field of Classification Search
USPC ............. 711/156, E12.002; 345/502, 522
See application file for complete search history.

(56) References Cited

U.S. PATENT DOCUMENTS 8,675,002 B1 * 3/2014 Andonieh et al. ............ 345/522

* cited by examiner

*Primary Examiner* — Edward Dudek, Jr.
(74) *Attorney, Agent, or Firm* — Volpe and Koenig, P.C.

(57) ABSTRACT

Method and apparatus for centralized timestamp processing is described herein. A graphics processing system includes multiple graphics engines and a timestamp module. For each task, a graphics driver assigns the task to a graphics engine and writes a task command packet to a memory buffer associated with the graphics engine. The graphics driver also writes a timestamp command packet for each task to a timestamp module memory buffer. A command processor associated with the graphics engine signals the timestamp module memory buffer upon completion of the task. If the read pointer is at the appropriate position in the timestamp module memory buffer, the timestamp module/timestamp module memory buffer executes the timestamp command packet and writes the timestamp to a timestamp memory. The timestamp memory is accessible by the graphics driver.

17 Claims, 6 Drawing Sheets

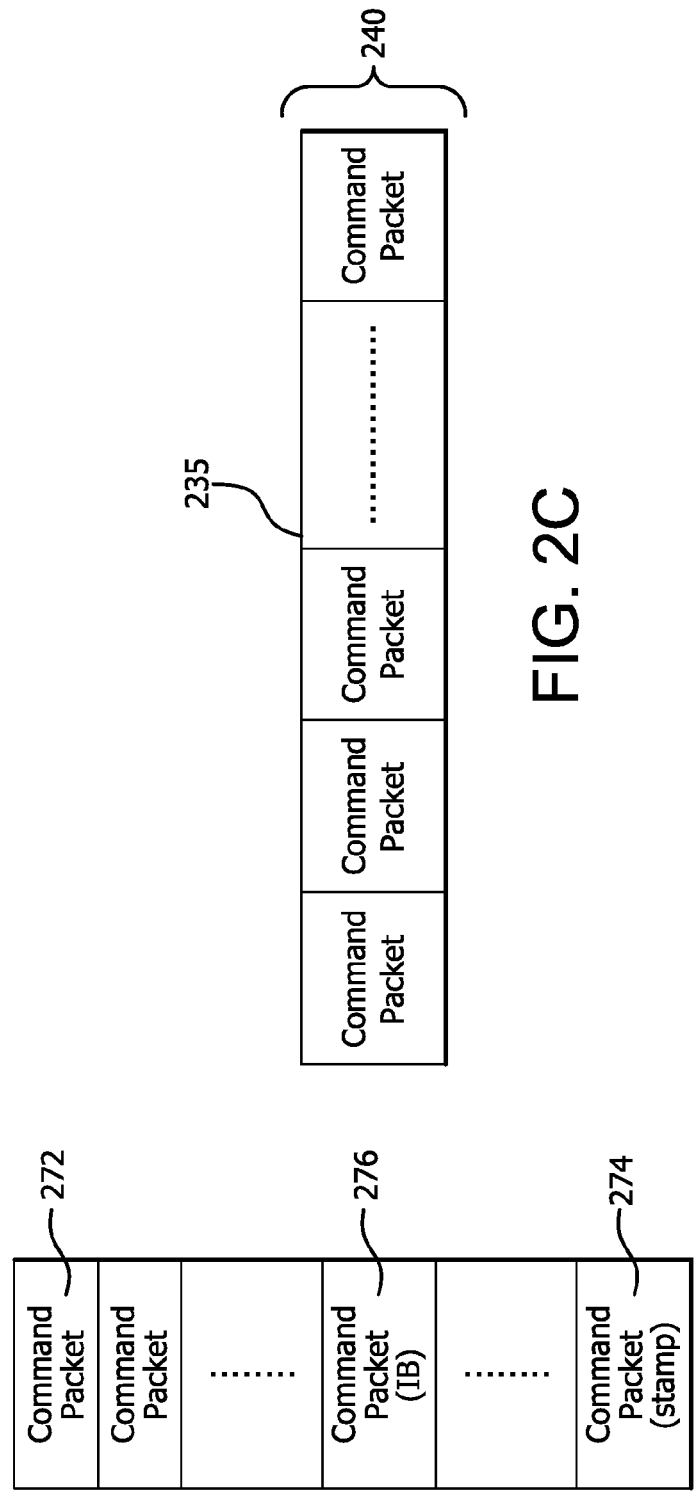

| Header 382 | Dword1 384 | Dword2 386 | Dword3 388 |

METHOD AND APPARATUS FOR CENTRALIZED TIMESTAMP PROCESSING

FIELD OF INVENTION

The present invention is generally directed to processors.

BACKGROUND

Graphics processing systems are using multiple engines to increase graphics and computing performance. Each engine has a ring buffer and a timestamp for processing task requests. The graphic driver will therefore have to maintain and account for every timestamp. This may become complicated and inefficient. Other processors face similar issues.

SUMMARY OF EMBODIMENTS

Method and apparatus for centralized timestamp processing is described herein. A processing system includes multiple engines and a timestamp module. For each task, a driver assigns the task to an engine and writes a task command packet to a memory buffer associated with the engine. The driver also writes a timestamp command packet for each task to a timestamp module memory buffer. A command processor associated with the engine signals the timestamp module memory buffer upon completion of the task. If the read pointer is at the appropriate position in the timestamp module memory buffer, the timestamp module/timestamp module memory buffer executes the timestamp command packet and writes the timestamp to a timestamp memory. The timestamp memory is accessible by the driver.

BRIEF DESCRIPTION OF THE DRAWINGS

A more detailed understanding may be had from the following description, given by way of example in conjunction with the accompanying drawings, wherein:

FIG. 2B is an example ring frame;

FIG. 2C is an example indirect buffer;

FIG. 3B is an example timestamp command packet; and

DETAILED DESCRIPTION

Figure 1:
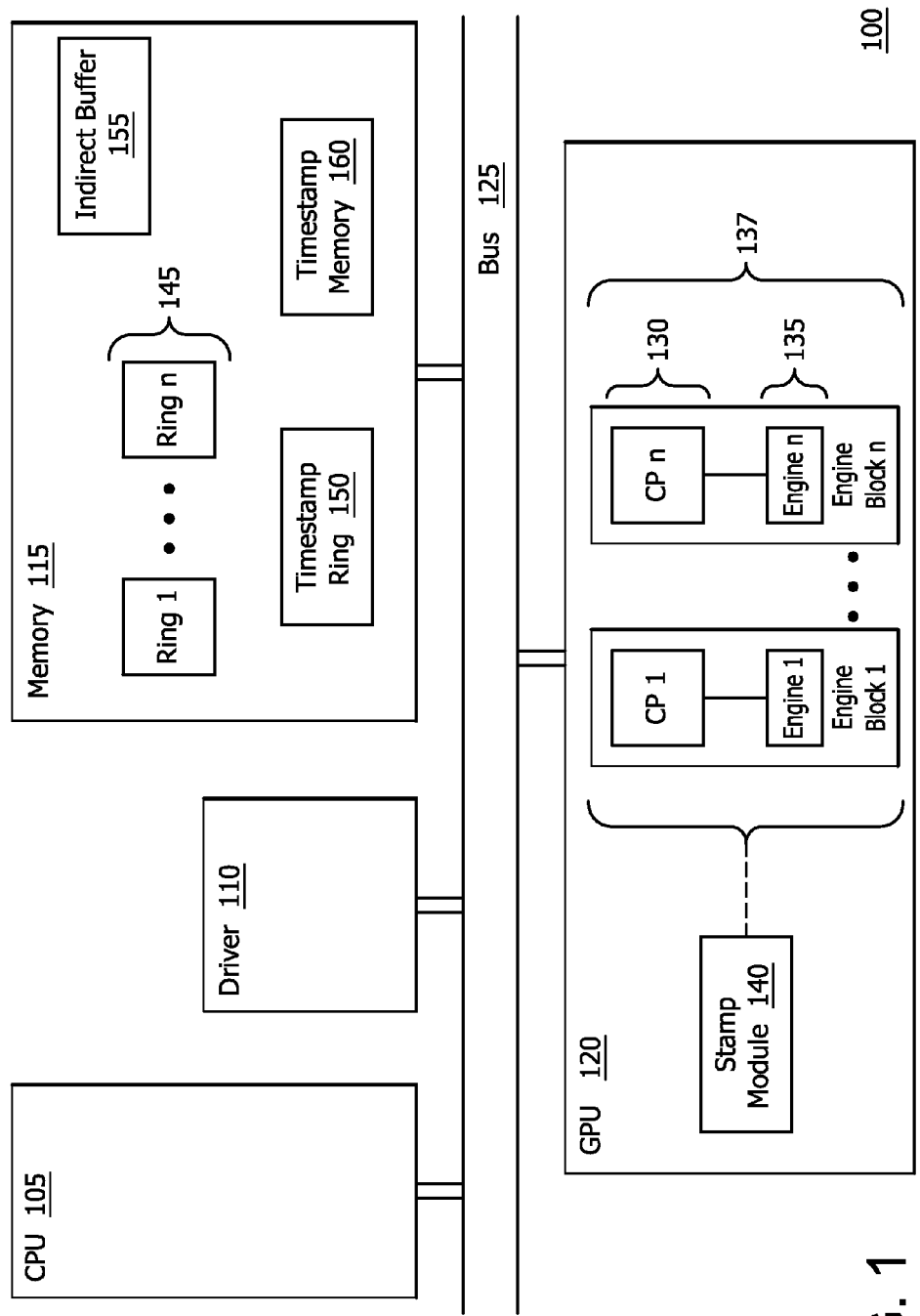
FIG. 1 is an example block diagram of a system having a timestamp ring.

FIG. 1 is a block diagram of an example device or processor 100, (in the exemplary embodiment device 100 is embodied as a graphics processing system) in which one or more disclosed embodiments may be implemented. The system 100 may be, for example, a computer, a gaming device, a handheld device, a set-top box, a television, a mobile phone, or a tablet computer. The system 100 includes a central processing unit (CPU) 105, a system memory 115, a graphics driver 110, a graphics processing unit (GPU) 120, and a communication infrastructure 125. A person of skill in the art will appreciate that system 100 may include software, hardware, and firmware components in addition to, or different from, that shown in FIG. 1. It is understood that the system 100 may include additional components not shown in FIG. 1.

The CPU 105 and GPU 120 may be located on the same die, (accelerated processing unit (APU)). The CPU 105 may be any commercially available CPU, a digital signal processor (DSP), application specific integrated processor (ASIC), field programmable gate array (FPGA), or a customized processor. The CPU 105 and/or GPU 120 may comprise of one or more processors coupled using a communication infrastructure, such as communication infrastructure 125. The CPU 105 and/or GPU 120 may also include one or more processors that have more than one processing core on the same die such as a multi-core processor. The memory 115 may be located on the same die as the CPU 105 and/or GPU 120, or may be located separately from the CPU 105 and/or GPU 120. The memory 115 may include a volatile or non-volatile memory, for example, random access memory (RAM), dynamic RAM, or a cache.

The CPU 105 executes an operating system (not shown) and one or more applications, and is the control processor for system 100. The operating system executing on CPU 105 controls, facilitates access and coordinates the accomplishment of tasks with respect to system 100.

The driver 110, (e.g., a graphics driver), may comprise software, firmware, hardware, or any combination thereof. In an embodiment, the graphics driver 110 may be implemented entirely in software. The driver 110 may provide an interface and/or application programming interface (API) for the CPU 105 and applications executing on the CPU 105 to access the GPU 120.

The communication infrastructure 125 may provide coupling between the components of system 100 and may include one or more communication buses such as Peripheral Component Interconnect (PCI), Advanced Graphics Port (AGP), and the like.

The GPU 120 provides graphics acceleration functionality and other compute functionality to system 100. The GPU 120 may include multiple command processors (CP) CP 1 . . . CP n 130, a stamp module 140 and multiple graphics engines (Engines) Engine 1 . . . Engine n 135, for example, 3D engines, unified video decoder (UVD) engines, and digital rights management (DRM) direct memory access (DMA) engines. GPU 120 may include a plurality of processors including processing elements such as arithmetic and logic units (ALU). It is understood that the GPU 120 may include additional components not shown in FIG. 1.

The CP 1 . . . CP n 130 control the processing within GPU 120 and may be connected to Engine 1 . . . Engine n 135 and stamp module 140. Each CP 1 . . . CP n 130 may be associated with Engine 1 . . . Engine n 135 and each pair is an engine block (EB) EB 1 . . . EB n 137. In another embodiment, the CP 1 . . . CP n 130 may be a single command processor. In general, the CP 1 . . . CP n 130 receives instructions to be executed from the CPU 105, and coordinate the execution of those instructions on Engine 1 . . . Engine n 135 in GPU 120. In some instances, the CP 1 . . . CP n 130 may generate one or more commands to be executed in GPU 120, that correspond to each command received from CPU 105. Logic instructions implementing the functionality of the CP 1 . . . CP n 130 may be implemented in hardware, firmware, or software, or a combination thereof.

The memory 115 may include a one or more memory devices and may be a dynamic random access memory (DRAM) or a similar memory device used for non-persistent storage of data. The memory 115 may include a timestamp memory buffer 150 corresponding to stamp module 140, a timestamp memory 160 and indirect buffers 155. During execution, memory 115 may have residing within it, one or more memory buffers 145 through which CPU 105 communicates commands to GPU 120. The memory buffers 145 may correspond to the graphics engines 135 or the engine blocks 137, as appropriate. Timestamp memory buffer 150 and memory buffers 145 may be ring buffers or other data structures suitable for efficient queuing of work items or command packets. In the instance of a ring buffer, command packets may be placed into and taken away from the memory buffers 145 in a circular manner. For purposes of illustration, memory buffers 145 may be referred to as ring buffers 145 herein.

The indirect buffers 155 may be used to hold the actual commands, (e.g., instructions and data). For example, when CPU 105 communicates a command packet to the GPU 120, the command packet may be stored in an indirect buffer 155 and a pointer to that indirect buffer 155 may be inserted in a ring buffer 145. As described herein below with respect to FIG. 2A, the CPU 105, via driver 110, as a writer of the commands to ring buffers 145 and GPU 120 as a reader of such commands, may coordinate a write pointer and read pointer indicating the last item added, and last item read, respectively, in ring buffers 145.

The stamp module 140, timestamp memory buffer 150, and the timestamp memory 160 enable the use of one timestamp for all the graphic engines and still allow the graphic engines to run concurrently, when applicable. As described herein below, the graphic engines notify the stamp module 140 upon completion of an assigned task. A command packet stored in the timestamp memory buffer 150 is then executed, which writes the timestamp in timestamp memory 160. The timestamp memory is accessible by the graphics driver 110 and may also be used by the operating system in the CPU 105.

Figure 2A:
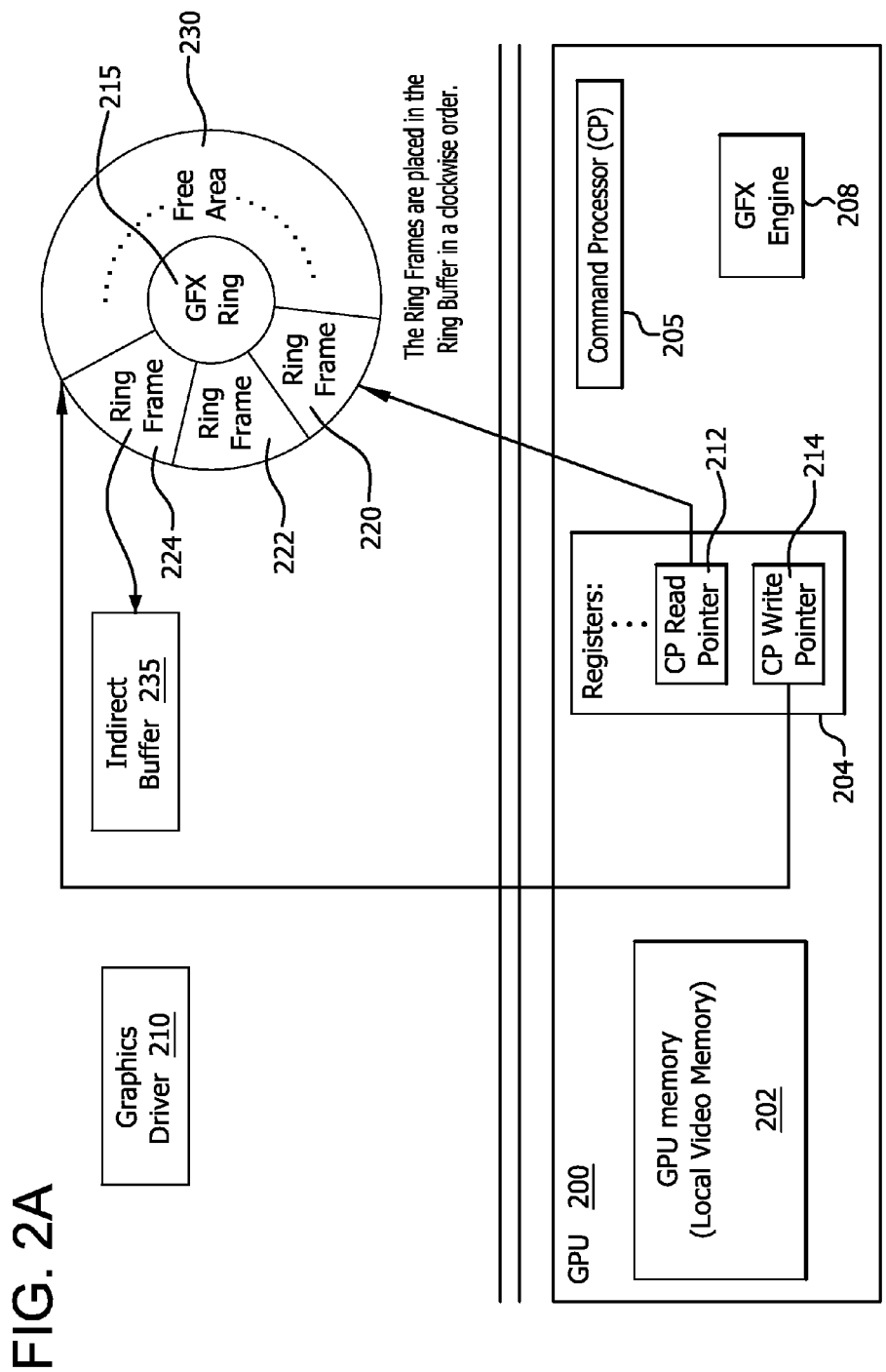
FIG. 2A is an example block diagram of command packet processing.

FIG. 2A is an example block diagram of command packet processing as between a GPU 200, a driver 210, an engine ring 215 and indirect buffer 235. GPU 200 includes a GPU memory 202, registers 204, a command processor 205, and a graphics engine (GFX) 208. The registers 204 include a read pointer 212 and a write pointer 214. The engine ring 215 may include ring frames 220, 222, 224 and free space 230. FIG. 2B shows an example ring frame 270 that includes command packets 272, a timestamp command packet 274 and an indirect buffer (TB) command packet 276 which points to the indirect buffer 235. Indirect buffer 235, as shown in FIG. 2C, includes command packets 240 which instruct the GPU 200 to carry out operations such as drawing an object in to memory.

The above architecture provides a one-way communication from a host processor, (the writer as represented by driver 210), to the GPU 200, (the reader as represented by the command processor 205). Initially the read pointer 212 and the write pointer 214 point to the same location indicating that GFX ring 215 is empty. The GFX ring 215 has free space 230 into which the driver 210 may write a command packet corresponding to a task. The driver 210 then updates the write pointer 214 to one position past the last command packets or the first available space. The write pointer 214 and read pointer 212 are now pointing to different locations. The command processor 205 may fetch command packets at the read pointer 212 position and walks the read pointer 212 until it is equal to the write pointer 214.

Figure 3A:
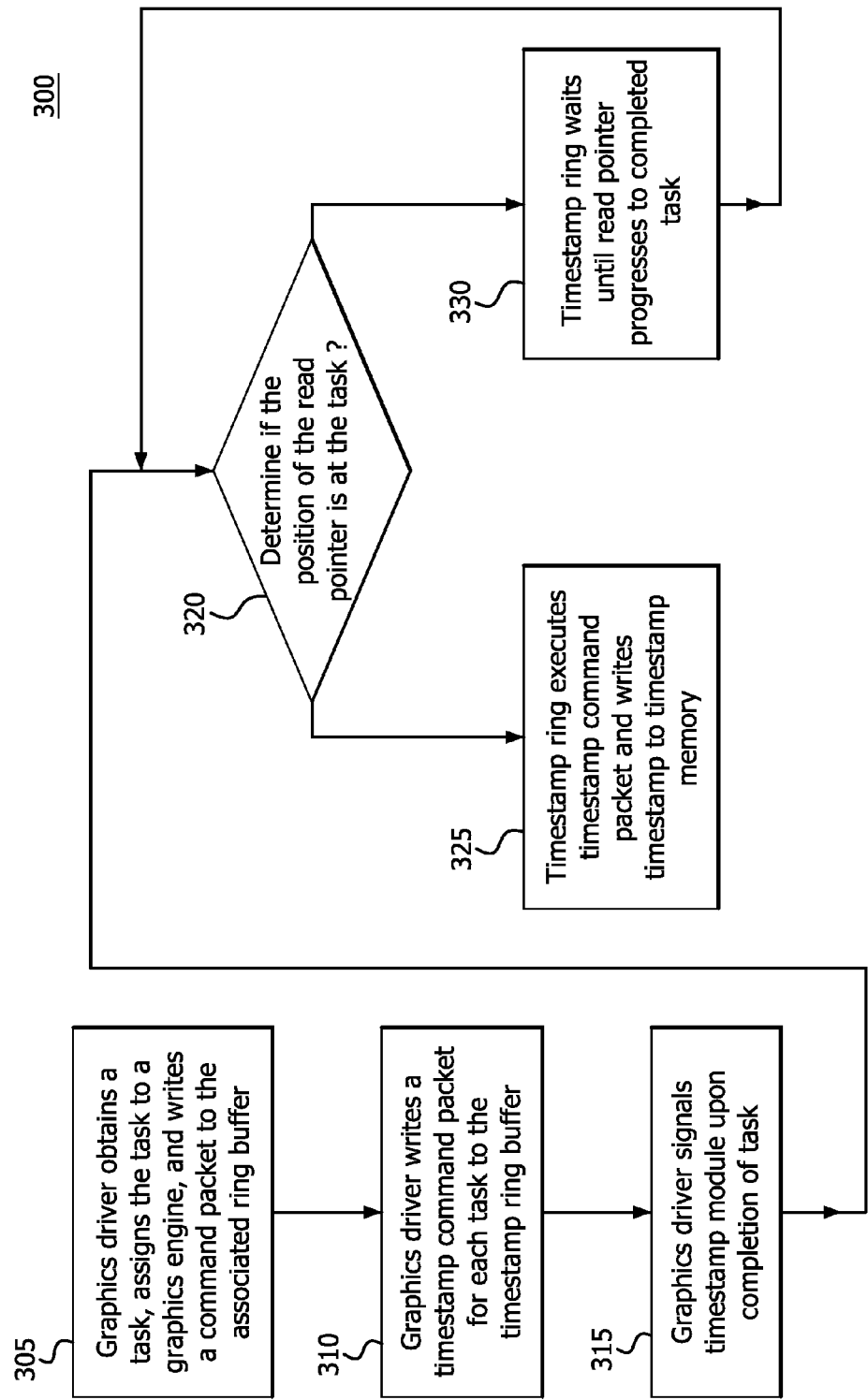
FIG. 3A is an example flowchart for centralized timestamp processing.

FIG. 3A is an example flowchart 300 for centralized timestamp processing and is described with reference to FIG. 1. For each task, the driver 110 obtains the task from a CPU 105, assigns the task to a graphics engine from among graphics engines 1 . . . n 135 and writes a command packet to the associated ring buffer from among ring buffers 1 . . . n 145 (305). The driver 110 also writes a timestamp command packet for each task to the timestamp ring buffer 150 (310). The timestamp command packet will contain a command to write a timestamp at timestamp memory 160 upon receiving a task completion notification from the assigned graphics engine.

FIG. 3B shows an example timestamp command packet 380. The timestamp command packet 380 may include a header 382 and there data words, Dword1 384, Dword2 386 and Dword3 388. The header 382 may have a format 0xC0030026, where the 0xC may indicate that this is a type 3 command packet, 003 may be the number of dwords that follow the header, and 26 is an operation code (opcode) to output the data dword. The Dword1 384 may have a format 0x0789abcd, which may be the low 32 bit address to the Timestamp Memory 160. The Dword2 386 may have a format 0x00000000, which may be the high 16 bit address to the Timestamp Memory 160 for a 48 bits GPU supported address, for example. The Dword3 388 may have a format 0x00003456, which may represent the data which is the actual timestamp.

Upon completion of the task by one of the engine blocks 1 . . . n 137 and in particular the associated command processor, the associated command processor signals the timestamp module 140 to execute the command packet in the timestamp ring 150 associated with the task (315). In a non-limiting example, the signaling may be implementing using a semaphore. In particular, the timestamp module 140/timestamp ring 150 waits for a semaphore bit to be set to one for the particular task. Other signaling methods may also be used. The timestamp module 140 determines the position of the read pointer (320). If the read pointer is at the appropriate position in the timestamp ring 150, the timestamp module 140/timestamp ring 150 executes the timestamp command packet and writes the timestamp to the timestamp memory 160 (325). If the read pointer is not at the right position, then timestamp module 140/timestamp ring 150 will wait until the read pointer is at the position of the completed task to write the timestamp (330).

Figure 4:
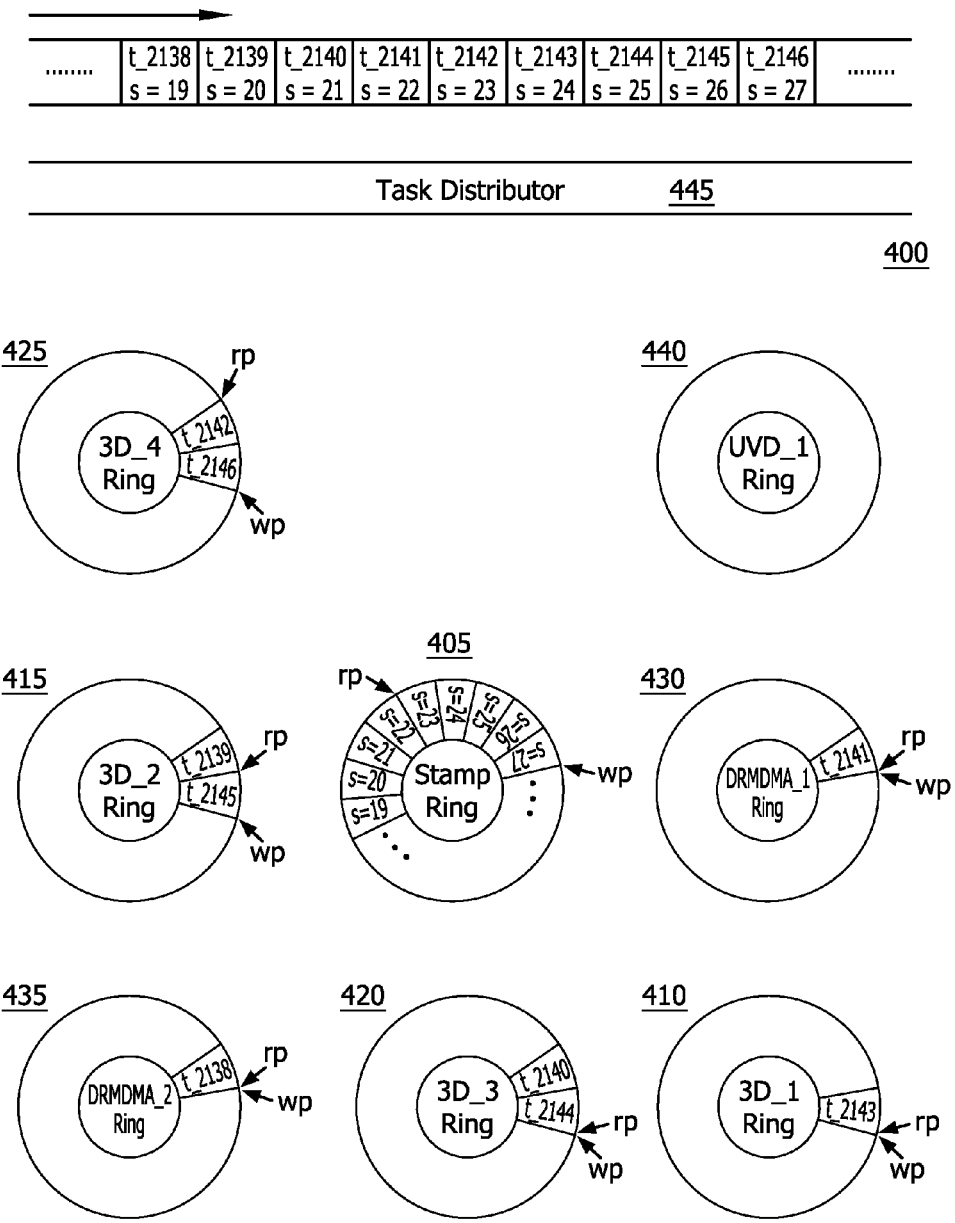
FIG. 4 is an example illustration of centralized timestamp processing.

FIG. 4 is an example illustration of centralized timestamp processing. A graphics processing system 400 includes a stamp ring 405 and a number of ring buffers corresponding to a number of graphics engines. In particular, the graphics processing system 400 includes a 3D_1 ring 410, a 3D_2 ring 415, a 3D_3 ring 420, a 3D_4 ring 425, a DRMDMA_1 ring 430, a DRMDMA_2 ring 435 and a UVD_1 ring 440. A task distributor 445 may distribute tasks to the graphics engines.

For example, the task distributor 445 may distribute or submit task t_2138 to the DRMDMA_2 engine and write a command packet to the DRMDMA_2 ring 435. If a ring is traversed in a clockwise direction, task submission may be determined by a position of a write pointer (wp). In this instance, the wp is at the end of the ring block signifying that the t_2138 has been written to the DRMDMA_2 ring 435. Again, if the ring is traversed in a clockwise direction, task completion may be evident from a particular ring by the position of a read pointer (rp). In this instance, the DRMDMA_2 engine has consumed the commands to complete the task and has signaled the stamp ring 405 to output a timestamp, which in this case is "19".

Similarly, task t_2139 was distributed and completed by the 3D_2 engine corresponding to 3D_2 ring 415, task t_2140 was distributed and completed by the 3D_3 engine corresponding to 3D_3 ring 420 and task t_2141 was distributed and completed by the DRMDMA_1 engine corresponding to DRMDMA_1 ring 430. The stamp ring 405 has therefore outputted timestamps "20", "21" and "22".

Task t_2142 was distributed to but not consumed by engine 3D_4 corresponding to 3D_4 ring 425. This may be seen by the position of the rp. The stamp ring 405 rp is also stopped and waiting for the signal from the engine 3D_4 corresponding to 3D_4 ring 425. In the meantime, task t_2143 which was distributed and completed by the 3D_1 engine corresponding to 3D_1 ring 410 and task t_2144 which was distributed and completed by the 3D_3 engine corresponding to 3D_3 ring 420, have signaled the stamp ring 405. The stamp ring 405 will wait until task t_2142 has been consumed by the 3D t_4 engine. At that time, the stamp ring 405 will proceed to output the associated timestamps up to timestamp '25'. The stamp ring 405 will then wait for the 3D_2 engine corresponding to the 3D_2 ring 415 to signal completion of the next task, which is task t_2145.

Embodiments of the present invention may be represented as instructions and data stored in a computer-readable storage medium. For example, aspects of the present invention may be implemented using Verilog, which is a hardware description language (HDL). When processed, Verilog data instructions may generate other intermediary data, (e.g., netlists, GDS data, or the like), that may be used to perform a manufacturing process implemented in a semiconductor fabrication facility. The manufacturing process may be adapted to manufacture semiconductor devices (e.g., processors) that embody various aspects of the present invention.

Although features and elements are described above in particular combinations, each feature or element may be used alone without the other features and elements or in various combinations with or without other features and elements. The methods provided may be implemented in a general purpose computer, a processor or any IC that utilizes timestamps. The methods or flow charts provided herein may be implemented in a computer program, software, or firmware incorporated in a computer-readable storage medium for execution by a general purpose computer or a processor. Examples of computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine. Such processors may be manufactured by configuring a manufacturing process using the results of processed hardware description language (HDL) instructions (such instructions capable of being stored on a computer readable media). The results of such processing may be maskworks that are then used in a semiconductor manufacturing process to manufacture a processor which implements aspects of the present invention.

What is claimed is:

1. A system, comprising:
    a processor including multiple processing engines, each engine having a memory buffer;
    the processor including at least one command processor associated with the multiple processing engines;
    a timestamp module having a corresponding timestamp memory buffer, wherein the at least one command processor is configured to signal the timestamp module upon completion of a task stored in an associated memory buffer; and
    a timestamp memory, wherein the timestamp module is configured to execute a command stored in the timestamp memory buffer by writing a timestamp to the timestamp memory for each completed task,
    wherein the timestamp module is configured to wait for task completion of an earlier task before writing a timestamp for a later task already completed.

2. The system of claim 1, further comprising:
    a driver, wherein the driver is configured to write a task to an assigned memory buffer; and
    the driver further configured to write the command to the timestamp memory buffer for each task.

3. The system of claim 1, wherein the memory buffer and the timestamp memory buffer are ring buffers.

4. The system of claim 1, wherein a semaphore is used to signal task completion.

5. The system of claim 1, wherein the timestamp module is configured to timestamp completed tasks in task order.

6. A method for timestamp processing, comprising:
    writing tasks to ring buffers associated with graphics engines in a graphical processing unit;
    writing a command to a stamp ring for each task;
    signaling task completion to the stamp ring;
    waiting for task completion of an earlier task before writing a timestamp for a later task already completed; and
    executing the command to write a timestamp to a timestamp memory in response to signaling of each completed task.

7. The method of claim 6, wherein a semaphore is used to signal task completion.

8. The method of claim 6, wherein timestamps are written in task order.

9. The method of claim 6, further comprising:
    writing the timestamp on a condition that a read pointer for the stamp ring is pointing at the task for which a task completion signal is received.

10. A device, comprising:
    a processor including graphics processing engines;
    a memory having a ring buffer corresponding to each of the graphics processing engines;
    the processor including a timestamp module;
    the processor including at least one command processor associated with the graphics processing engines;
    the memory having a timestamp ring buffer corresponding to the timestamp module, wherein the at least one command processor is configured to signal the timestamp module upon completion of a task stored in an associated ring buffer; and
    the memory including a timestamp memory, wherein the timestamp module is configured to execute a command stored in the timestamp ring buffer by writing a timestamp to the timestamp memory for each completed task,
    wherein the timestamp module is configured to wait for task completion of an earlier task before writing a timestamp for a later task already completed.

11. The device of claim 10, further comprising:
    a driver, wherein the driver is configured to write a task to a ring buffer corresponding to an assigned graphics processing engine; and
    the driver further configured to write the command to the timestamp ring buffer for each task.

12. The device of claim 10, wherein a semaphore is used to signal task completion.

13. The device of claim 10, wherein the timestamp module is configured to timestamp completed tasks in task order.

14. A computer-readable storage medium configured to store a set of instructions used for manufacturing an electronic device, wherein the electronic device comprises:
- a processor including multiple processing engines, each engine having a memory buffer;
- the processor including at least one command processor associated with the multiple processing engines;
- a timestamp module having a corresponding timestamp memory buffer, wherein the at least one command processor is configured to signal the timestamp module upon completion of a task stored in an associated memory buffer; and
- a timestamp memory, wherein the timestamp module is configured to execute a command stored in the timestamp memory buffer by writing a timestamp to the timestamp memory for each completed task,
- wherein the timestamp module is configured to wait for task completion of an earlier task before writing a timestamp for a later task already completed.

15. The computer-readable storage medium of claim 14, wherein the instructions are Verilog data instructions.

16. The computer-readable storage medium of claim 14, wherein the instructions are hardware description language (HDL) instructions.

17. A computer readable media including hardware description language (HDL) code stored thereon, and when processed generates other intermediary data to create mask works for use in fabricating a processor that is configured to perform a method of timestamp processing, the method comprising:
- writing tasks to ring buffers associated with graphics engines;
- writing a command to a stamp ring for each task;
- signaling task completion to the stamp ring;
- waiting for task completion of an earlier task before writing a timestamp for a later task already completed; and
- writing a timestamp to a timestamp memory in response to signaling of each completed task.

\* \* \* \* \*